United States Patent [19]
Wildenau

[11] Patent Number: 5,189,087
[45] Date of Patent: * Feb. 23, 1993

[54] PLASTIC MATERIALS FOR THE PRODUCTION OF DEEP-DRAWN FILMS

[75] Inventor: Artur Wildenau, Isernhagen, Fed. Rep. of Germany

[73] Assignee: J. H. Benecke GmbH, Fed. Rep. of Germany

[ * ] Notice: The portion of the term of this patent subsequent to Feb. 23, 2007 has been disclaimed.

[21] Appl. No.: 218,574

[22] Filed: Jul. 12, 1988

Related U.S. Application Data

[63] Continuation-in-part of Ser. No. 41,850, Apr. 23, 1987, Pat. No. 4,778,841, which is a continuation-in-part of Ser. No. 861,154, May 8, 1986, abandoned.

[30] Foreign Application Priority Data

May 8, 1985 [DE] Fed. Rep. of Germany .... 3516519.7

[51] Int. Cl.$^5$ .......................... C08K 5/01; C08J 5/18; C08L 23/02; C08L 53/02
[52] U.S. Cl. ................................. 524/151; 524/101; 524/109; 524/275; 524/298; 524/420; 524/505; 524/520; 524/523; 525/70; 525/92
[58] Field of Search ............... 524/109, 151, 275, 298, 524/420, 520, 523, 505, 101; 525/70, 92

[56] References Cited

U.S. PATENT DOCUMENTS

| | | | |
|---|---|---|---|
| 4,128,605 | 12/1978 | Kishida et al. | 525/70 |
| 4,579,907 | 4/1986 | Wildenau | 525/92 |
| 4,778,841 | 10/1988 | Wildenau | 524/151 |

Primary Examiner—Herbert J. Lilling
Attorney, Agent, or Firm—Allegretti & Witcoff, Ltd.

[57] ABSTRACT

Plastic compositions for the production of deep-drawn films have the following composition:

| | Parts By Weight |
|---|---|
| Polyvinyl chloride | 35-40 |
| Acrylate rubber/PVC (1:1) | 40-50 |
| Plasticizer | 5-10 |
| Polystyrene/polyethylenebutylene block copolymer | 1-10 |
| Processing agent | 4-5 |

The plastic film products from these materials have a high degree of strength and resistance to aging. Inhomogeneities and hard particles in the films are eliminated.

6 Claims, No Drawings

PLASTIC MATERIALS FOR THE PRODUCTION OF DEEP-DRAWN FILMS

This application is a continuation-in-part of co-pending Ser. No. 041,850, filed Apr. 23, 1987 now U.S. Pat. No. 4,778,841 which in turn is a continuation-in-part of Ser. No. 861,154, filed May 8, 1986, now abandoned.

A number of deep-drawn films based on polymer mixtures are known that use polyvinyl chloride (PVC). The properties of such films, however, are not satisfactory with respect to resistance to aging and strength, especially under thermal stress.

Plastic materials based on ethylene vinyl acetate (EVA) or polyethylene (PE) tend during deep drawing to form "flecks" (i.e. hard spots) or undissolved particles of higher molecular weights or cross-linked resin. Ethylene vinyl acetate cannot be brought to a fluid form, particularly with high content of vinyl acetate (about 70%).

The object of the present invention is to provide plastic materials that can be easily drawn into films, whose properties are improved, especially with regard to strength and resistance to aging. The invention permits the ingredients to be mixed efficiently and simply in a heated vessel, and subsequently calendered or extruded into films.

The plastic materials for achieving the objective of the invention have the following composition:
a) 55-65 parts by weight polyvinyl chloride;
b) 50-60 parts by weight acrylate rubber;
c) 1-10 parts by weight polystyrene/polyethylene-butylene block copolymer;
d) 5-10 parts by weight plasticizer; and
e) 4-5 parts by weight processing agents.

These plastic materials are characterized by improved workability, enhanced strength and improved resistance to aging.

In a preferred composition the polyvinyl chloride takes the following form and the acrylate rubber is incorporated in admixture with PVC as follows:
a) 35-40 parts by weight S-PVC dispersion resin with a K value of about 60; and
b) 40-50 parts by weight of a mixture of acrylate rubber and PVC.

Preferably, the mixture ratio of acrylate rubber to PVC=1:1 in b) above.

S-PVC represents PVC that has been formed by suspension polymerization. That is, the monomer of mixture of monomers is dispersed by mechanical agitation in a second liquid phase in which both the monomer and polymer are essentially insoluble. The resulting polymers may be in the form of pearls, beads, soft spheres or irregular granules which are easily spearated when agitation is ceased.

The normally used processing agents are utilized preferably in the following composition:
a) 2 parts by weight SnS (stabilizer);
b) 0.3 parts by weight partly oxidized polyethylene wax;
c) 1 part by weight tris(hydroxyethyl) isocyanurate;
d) 0.3 parts by weight tris(nonylphenyl) phosphite; and
d) 0.3 parts by weight tris(nonylphenyl) phosphite; and
e) 1 part by weight octadecyl 3-(3.5-4 hydroxyphenyl propionate).

One example of plastic materials that can be worked into films is given below.

A special advantage of the plastic materials according to the invention is that they can be transformed into purlable forms, which is not possible with ethylene vinyl acetate (e.g., the commercial product Levapren). This considerably facilitates the production of films.

TABLE I

| Ingredient | Example |
|---|---|
| S-PVC dispersion resin with K value of about 60 | 35 |
| Epoxidized fatty acid ester plasticizer | 5 |
| Acrylate rubber/PVC (1:1) | 50 |
| Polystyrene/polyethylene-butylene block copolymer | 10 |
| Processing Agents | |
| SnS stabilizer | 2 |
| Partly oxidized polyethylene wax | 0.3 |
| Tris(hydroxyethyl) isocyanurate | 1 |
| Tris(nonylphenyl) phosphite | 0.3 |
| Octadecyl 3-(3.5-4 hydroxyphenyl propionate) | 1 |

Acrylate rubbers are thermoplastic polymers consisting largely of one or more esters of acrylic acid such as ethyl acrylate and butyl acrylate. Since acrylate rubbers have no double bonds, they are very resistant to aging, heat, fatigue, oxygen, ozone, oil and ultraviolet light.

Other suitable plasticizers are trimellithate esters of aliphatic alcohols having 6 to 12 carbon atoms e.g., 2-ethylhexyl trimellithate.

From plastic materials in the example of Table I, strips were made and their elongation at break and permanent sets measured in the delivery state, as well as after a heat treatment and exposure to a xenon lamp. The results are given in Table II below.

TABLE II

| Example | Elongation At Break Delivery Condition Lengthwise | Elongation At Break After 500 hrs. 120° Lengthwise | Elongation At Break After 500 hrs. xenon lamp test exposure Lengthwise | Permanent Set (%) After 500 hrs. 120° Lengthwise | Permenant Set (%) After 500 hrs. xenon lamp test exposure Lengthwise |
|---|---|---|---|---|---|
| 1 | x = 170<br>s = 10<br>n = 5 | x = 160 | x = 170 | 94 | 100 |
| 2 | x = 180<br>s = 11<br>n = 5 | x = 160 | x = 170 | 89 | 94 |
| 3 | x = 160<br>s = 3, 9<br>n = 5 | x = 170 | x = 160 | 106 | 100 |
| 4 | x = 170<br>s = 5<br>n = 5 | x = 170 | x = 170 | 100 | 100 |

TABLE II-continued

| Example | Elongation At Break Delivery Condition Lengthwise | Elongation At Break After 500 hrs. 120° Lengthwise | Elongation At Break After 500 hrs. xenon lamp test exposure Lengthwise | Permanent Set (%) After 500 hrs. 120° Lengthwise | Permanent Set (%) After 500 hrs. xenon lamp test exposure Lengthwise |
|---|---|---|---|---|---|
| 5 | x = 190<br>s = 9<br>n = 5 | x = 200 | x = 170 | 105 | 89 | x = average value
s = variation
n = number of samples

The permanent set is a characteristic indicative of the life or aging resistance of the plastic material. The permanent set after 500 hours 100° C. should be above 50% and the permanent set after 500 hours xenon test exposure should be above 67%. The prior art plastic materials suitable for deep drawing do not reach these values.

The plastic materials according to the invention contain no plasticizing agent on the basis of ethylene vinyl acetate or olefin terpolymers. The films produced from the plastic materials of the invention have no inhomogeneities and no hard flecks or particles.

The plastic materials according to the above mentioned compositions are preferably produced as follows:

EXAMPLE 35 parts by weight S-PVC with a K value of about 60 are heated up to 120° C. under stirring in a heating vessel and are mixed during further stirring with 5 parts by weight of 2-ethylhexyl trimellithate plasticizer, 2 parts by weight SnS stabilizer and 0.3 parts by weight tris(nonylphenyl) phosphite until a first homogenized mixture is obtained. Homogenization takes about 5 minutes. This first homogenized mixture is then cooled down to room temperature thus giving a purlable, sandy product which is a dryblend. Then there are added to this mixture in said heating vessel or in a mixer, the further ingredients of the recipe: 40 parts by weight acrylate rubber/PVC (1:1), 10 parts by weight polystyrene/polyethylene-butylene block copolymer, 0.3 parts by weight partly oxidized polyethylene wax, 1 part by weight tris(hydroxyethyl) isocyanurate, 0.3 parts by weight tris(nonylphenyl) phosphite and 1 part by weight octadecyl 3-(3.5-4 hydroxyphenyl propionate). Maintain stirring until there is obtained a second homogenized mixture. This second homogenized mixture then is treated by a well-known calendering process or extrusion process to provide a film.

In the example, S-PVC is used in the form of powder. The plasticizer, SnS stabilizer and tris(nonylphenyl) phosphite are added in form of a homogenized, liquid mixture. The further added ingredients of the recipe are added in form of a homogenized solid mixture. Mixing is continued until there is obtained a mixture with uniform distribution of the ingredients, i.e. complete homogenization.

What is claimed is:

1. A plastic composition for the production of deep-drawn films characterized by improved resistance to aging consisting essentially of:
   a) 55-65 parts by weight of PVC;
   b) 50-60 parts by weight of acrylate rubber;
   c) 1-10 parts by weight of polystyrene/polyethylene-butylene block copolymer;
   d) 5-10 parts by weight of a plasticizer; and
   e) 4-5 parts by weight of a processing agent.

2. The composition of claim 1 in which the PVC and acrylate rubber are present in equal parts.

3. The composition of claim 1 in which the processing agent consists essentially of:
   a) 2 parts by weight SnS;
   b) 0.3 parts by weight partly oxidized polyethylene wax;
   c) 1 part by weight tris(hydroxyethyl) isocyanurate;
   d) 0.3 parts by weight tris(nonylphenyl) phosphite; and
   e) 1 part by weight octadecyl 3-(3.5-4 hydroxyphenyl propionate).

4. The composition of claim 1 in which said plasticizer is an epoxydized fatty acid ester, or a trimellithate ester.

5. A plastic composition for the production of deep-drawn films having the following homogenized composition:

|  | Parts by Weight |
|---|---|
| S-PVC dispersion resin with a K value of about 60 | 35-40 |
| Acrylate rubber/PVC mixture (1:1) | 40-50 |
| Polystyrene/polyethylene-butylene block copolymer | 1-10 |
| Plasticizer | 5-10 |
| Processing agents | 4-5 |

6. A plastic composition for the production of deep-drawn films having the following composition:

|  | Parts by Weight |
|---|---|
| S-PVC dispersion resin with K value of about 60 | 35 |
| Epoxidized fatty acid ester plasticizer | 5 |
| Acrylate rubber/PVC (1:1) | 50 |
| Polystyrene/polyethylene-butylene block copolymer | 10 |
| Processing Agents |  |
| SnS stabilizer | 2 |
| Partly oxidized polyethylene wax | 0.3 |
| Tris(hydroxyethyl) isocyanurate | 1 |
| Tris(nonylphenyl) phosphite | 0.3 |
| Octadecyl 3-(3.5-4 hydroxyphenyl propionate) | 1 |

* * * * *